(12) United States Patent
Riibe et al.

(10) Patent No.: US 7,699,274 B2
(45) Date of Patent: Apr. 20, 2010

(54) TEMPORARY ATTACHMENT FOR USE WITH PIPE HANGERS

(76) Inventors: Gary Riibe, 18546 County Rd., P8, Herman, NE (US) 68029; Marissa R. Anderson, 704 West St., Herman, NE (US) 68029

( * ) Notice: Subject to any disclaimer, the term of this patent is extended or adjusted under 35 U.S.C. 154(b) by 59 days.

(21) Appl. No.: 12/070,829

(22) Filed: Feb. 21, 2008

(65) Prior Publication Data
US 2009/0212170 A1    Aug. 27, 2009

(51) Int. Cl.
*F16L 3/16*    (2006.01)
(52) U.S. Cl. .................. 248/55; 269/289 MR
(58) Field of Classification Search ............. 248/55, 248/132, 70, 405, 406.1, 59; 269/289 MR; 144/287; 384/46, 549, 58
See application file for complete search history.

(56) References Cited

U.S. PATENT DOCUMENTS

| | | | | |
|---|---|---|---|---|
| 1,561,850 A | * | 11/1925 | Guttman | 248/55 |
| 1,911,485 A | * | 5/1933 | Axlund | 248/55 |
| 2,269,700 A | * | 1/1942 | Treshow | 248/130 |
| 2,733,330 A | * | 1/1956 | Blewett | 248/354.4 |
| 2,893,669 A | | 7/1959 | Kindorf | |
| 3,554,475 A | * | 1/1971 | Benno | 248/55 |
| 3,602,492 A | * | 8/1971 | Petrie | 269/296 |
| 3,687,407 A | * | 8/1972 | Dickerson | 248/59 |
| 3,735,973 A | * | 5/1973 | Petrie | 269/296 |
| 3,769,190 A | | 10/1973 | Deem, Jr. | |
| 3,791,564 A | | 2/1974 | Hugonin | |
| 5,685,508 A | | 11/1997 | Smith | |
| 6,364,256 B1 | | 4/2002 | Neider et al. | |
| 6,988,719 B2 | * | 1/2006 | Ursell et al. | 269/289 MR |
| 7,284,728 B2 | | 10/2007 | Connolly | |
| 2004/0113025 A1 | | 6/2004 | Sargent | |

* cited by examiner

*Primary Examiner*—Anita M King
(74) *Attorney, Agent, or Firm*—Dennis L. Thomte; Thomte Patent Law Office LLC

(57) ABSTRACT

A temporary attachment for use with pipe hangers is disclosed which includes an elongated angle member which is supported upon the lower end of a pipe hanger and which has a plurality of ball transfer units positioned thereon which support the pipe being hung. The ball transfer units not only permit the longitudinal movement of the associated pipe with respect to the pipe hanger but also permits the pipe to be rotated about its longitudinal axis with respect to the pipe hanger.

12 Claims, 6 Drawing Sheets

TEMPORARY ATTACHMENT FOR USE WITH PIPE HANGERS

BACKGROUND OF THE INVENTION

1. Field of the Invention

This invention relates to a temporary attachment for use with a pipe hanger and more particularly to a temporary attachment which facilitates the pulling of pipes through pipe hangers and even more particularly to a temporary attachment for use with pipe hangers which enables pipes to be moved longitudinally through the pipe hangers and which permits rotational movement of the pipes with respect to the pipe hangers during the welding of the pipes together.

2. Description of the Related Art

Pipe hangers are often used for suspending pipes from ceilings or other structures such as bridge works, etc. Typically, a plurality of pipe hangers are used in a spaced-apart parallel arrangement to suspend pipes from ceilings or other structures. When the pipes are large-diameter pipes and thus very heavy, large-diameter pipes are to be suspended from a support structure, the pipe hangers may be spaced apart every ten feet or so. A first length of pipe is inserted through the pipe hangers by means of a crane or the like. When the first length of pipe has been inserted into the hangers, successive lengths of pipe are pushed or pulled along the hangers. At some point, it is necessary to weld the ends of the pipe lengths together to form a pipe line, which may be difficult since the ends of the pipes may be located in a bridge work or the like, which means that the welder must attempt to reach around the ends of the adjacent pipes to weld the pipes together. It is not normally possible to rotate the pipes to facilitate the welding process in close quarters due to the size and weights of the pipes. Although some pipe hangers have incorporated rollers therein which permit the pipes to be more easily moved lengthwise down the row of hangers, applicants are unaware of any pipe hangers which not only permit lengthwise movement of the pipes with respect to the pipe hangers but which also permit the pipes to be rotated with respect to the pipe hangers to facilitate the welding thereto. Further, those pipe hangers which have rollers mounted thereon for lengthwise movement of the pipes with respect to the pipe hangers, those rollers are a permanent part of the hangers which can add to the cost of the installation and which may not be sturdy enough to withstand the weight of the pipes and contents thereof over a long period of time.

SUMMARY OF THE INVENTION

A temporary attachment for use with pipe hangers is disclosed wherein the attachment includes an elongated angle member having a horizontally disposed top wall with first and second ends, and first and second sides, a vertically disposed side wall extending downwardly from the first side of the top wall with the side wall having first and second ends, an upper end and a lower end. At least first and second upstanding space-apart supports extend upwardly from the top wall of the angle member at the center length thereof. At least a third support is secured to the top wall outwardly of the first support and extends upwardly from the top wall at an angle thereto towards the center length of the top wall. At a least a fourth support is secured to the top wall outwardly of the second support and extends upwardly from the top wall at an angle thereto towards the center length of the top wall. At least a fifth support is secured to the top wall outwardly of the third support and extends upwardly from the top wall at an angle thereto towards the center length of the top wall. At least a sixth support is secured to the top wall outwardly of the fourth support and extends upwardly from the top wall at an angle thereto towards the center length of the top wall.

Each of the supports have a conventional ball transfer unit mounted at the upper end thereof which is adapted to engage the exterior surface of a pipe supported on the temporary attachment which are adapted to engage the exterior surface of a pipe supported on the supports whereby the pipe may be longitudinally moved with respect to the supports and also rotatably moved with respect to the supports.

The temporary attachments which are attached to all of the pipe hangers are quickly and easily mounted on the pipe hangers and are quickly and easily removed from the pipe hangers once the pipes have been welded together and placed in their proper position.

Therefore, it is a principal object of the invention to provide a temporary attachment for use with pipe hangers which not only facilitates the longitudinal movement of pipes through the pipe hangers but which also permits the pipes to be rotatably mounted with respect to the pipe hangers for welding.

A further object of the invention is to provide a temporary attachment of the type described which is installed on pipe hangers prior to the installation of the pipes which will be extended therethrough and which may be removed therefrom after the pipes have been properly positioned and welded together.

Another object of the invention is to provide a temporary attachment of the type described which does not require any modification of the pipe hangers associated therewith.

These and other objects will be apparent to those skilled in the art.

DESCRIPTION OF THE PREFERRED EMBODIMENT

Figure 1:
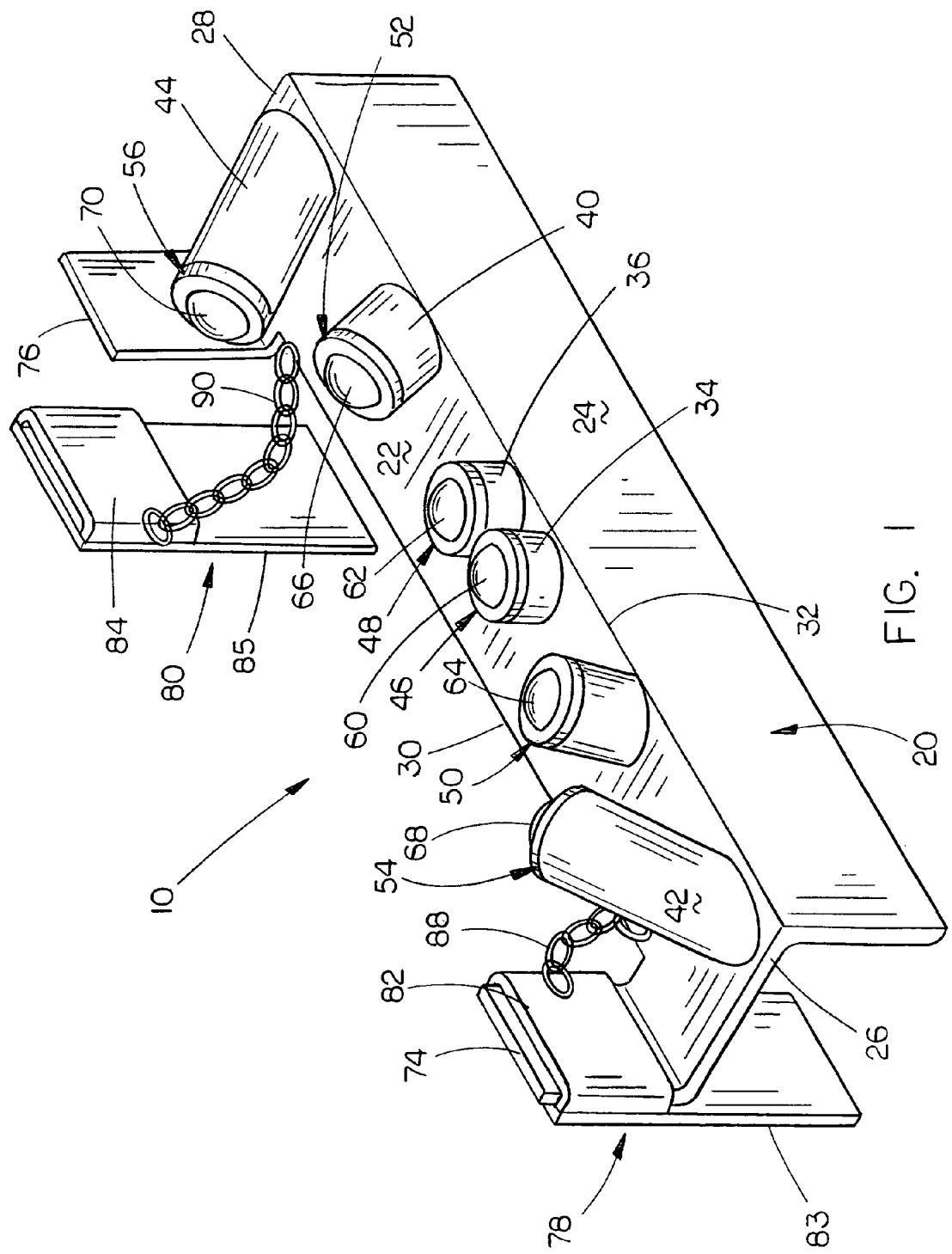
FIG. 1 is a perspective view of a first embodiment of the invention.

In FIG. 1, the preferred embodiment of the temporary attachment of this invention is referred to generally by the reference numeral 10, which is designed to be used with many shapes and designs of conventional pipe hangers such as that illustrated in the drawings and which are referred to generally by the reference numeral 12. Normally, the pipe hangers 12 will include at least a pair of vertically disposed and horizontally spaced-apart supports 14 and 16 which will normally be I-beams when large diameter pipes are to be supported from a supporting structure such as a ceiling or bridge work. Normally, a horizontally extending support member 18 will be secured to and will extend between the lower ends of the supports 14 and 16. Again, if large pipes are being hung, the horizontal support 18 will usually be an I-beam.

Figure 3:
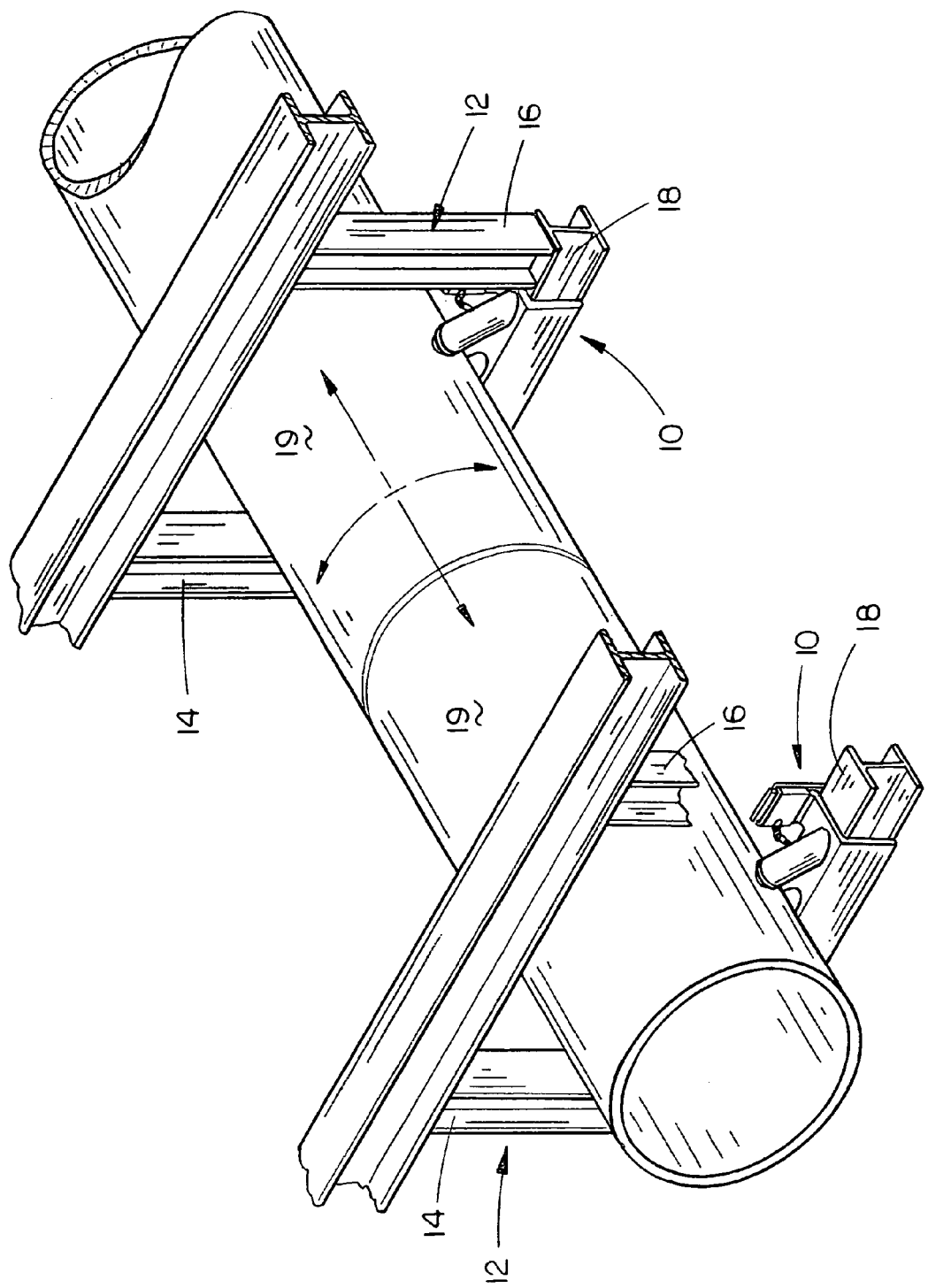
FIG. 3 is a perspective view illustrating the temporary attachments of this invention mounted on a pair of spaced-apart pipe hangers.
Figure 4:
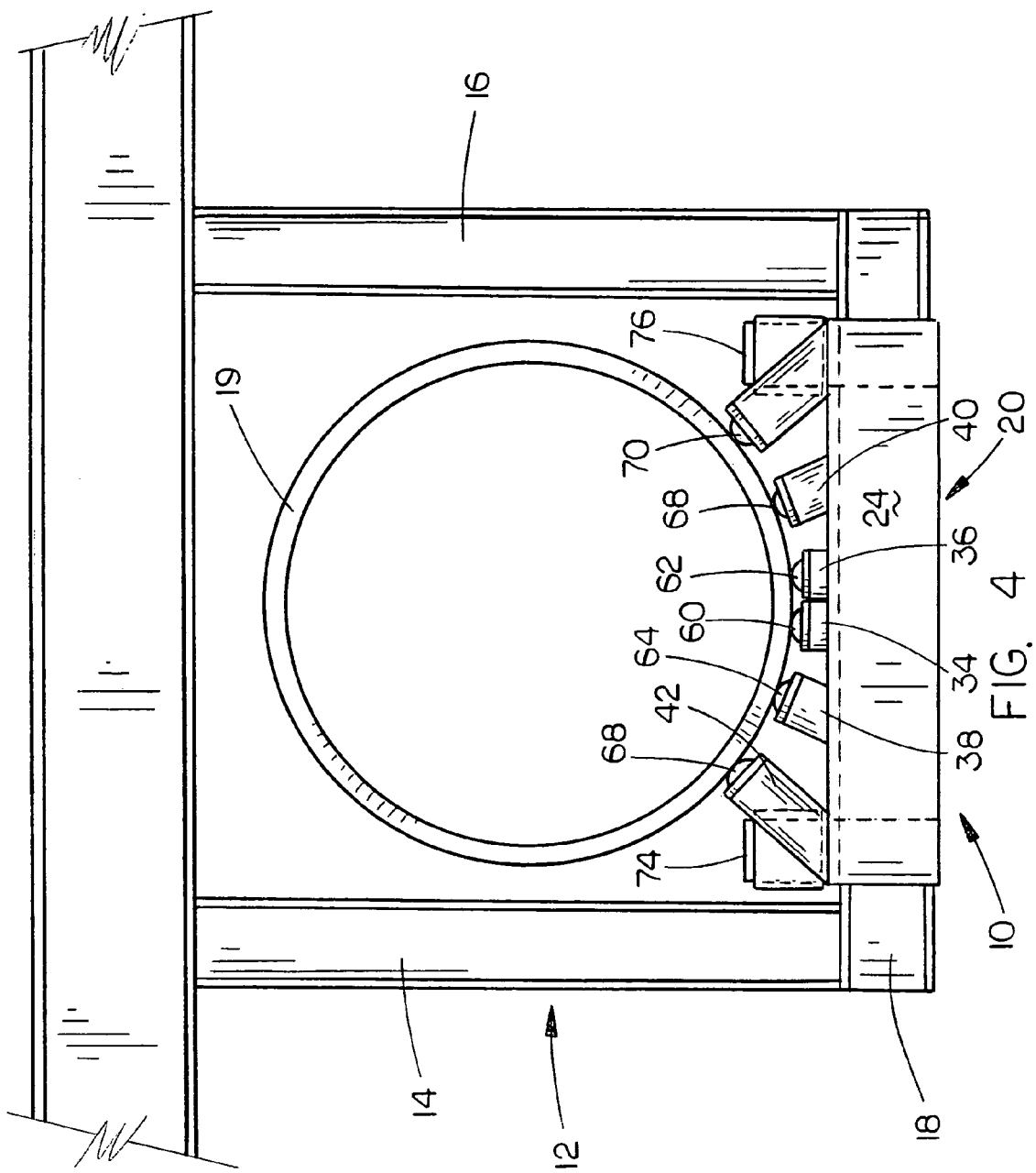
FIG. 4 is an end view of the attachments mounted on a pipe hanger and which supports a pipe thereon.
Figure 5:
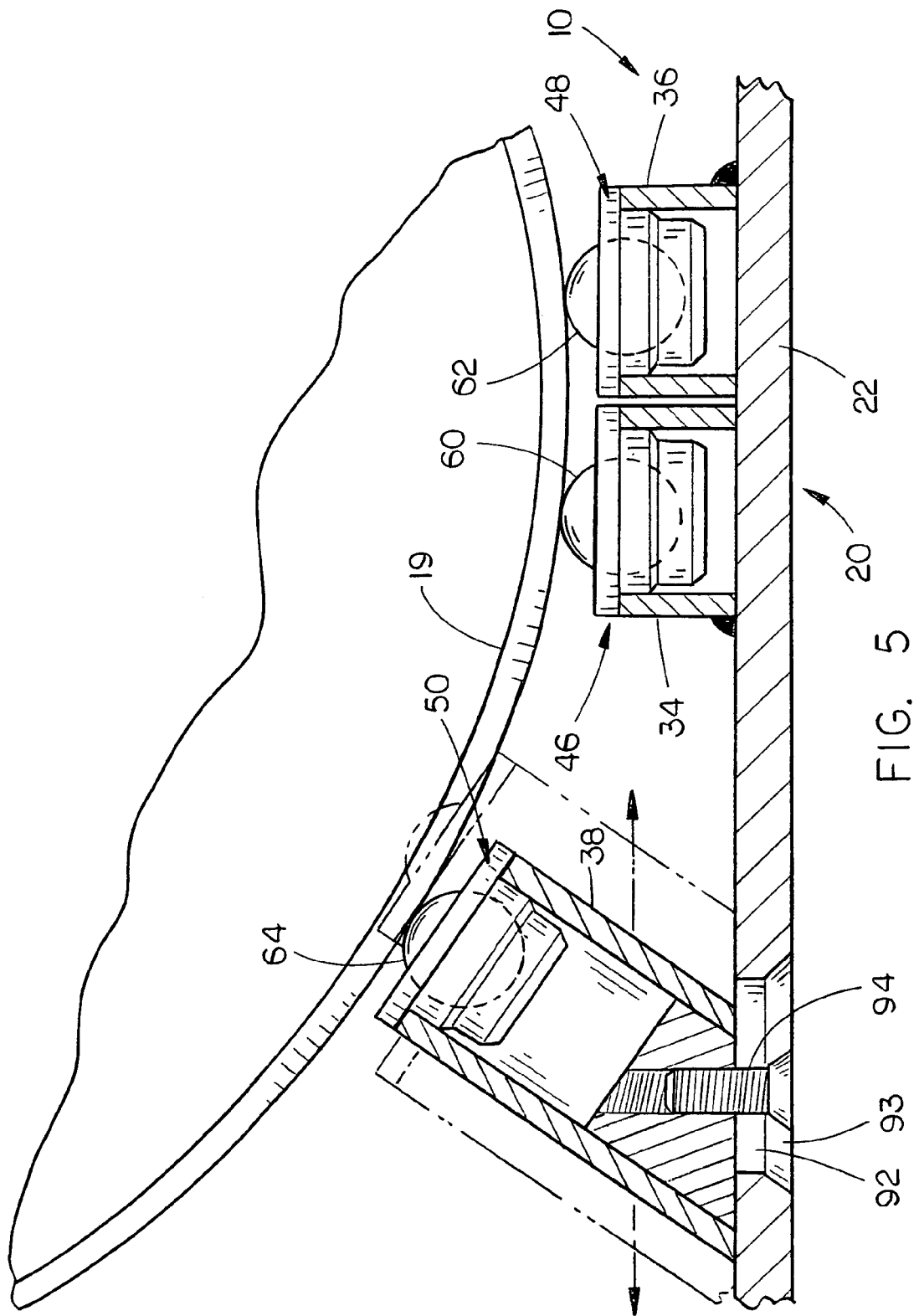
FIG. 5 is a partial transverse sectional view of the second embodiment of the attachment of this invention temporarily supporting a pipe thereon.

Normally, as seen in FIG. 3, a plurality of the pipe hangers 12 will be secured to a suitable support structure such as a ceiling or the like and which will be arranged in a parallel or horizontally spaced-apart positions to support a plurality of lengths of pipe 19 which will eventually be welded together to form a pipeline. In the preferred embodiment, attachment 10 includes an elongated member 20 having a horizontally disposed top wall 22 and a vertically disposed side wall 24 extending downwardly from one side thereof. For purposes of description, top wall 22 will be described as having ends 26 and 28 and opposite side edges 30 and 32. As seen in the drawings, side wall 24 extends downwardly from side edge 32 of top wall 24.

In the embodiment of FIG. 1, a pair of upstanding supports 34 and 36 are welded to the top wall 22 adjacent side wall 24 in a spaced-apart relationship and extend upwardly therefrom. The numeral 38 refers to a support which is positioned outwardly of support 34 and which is welded to top wall 22 adjacent side wall 24 and which extends upwardly and inwardly towards the center length of the angular member 20. The numeral 40 refers to a support which is secured to top wall 22 by welding laterally of support 36 and which extends upwardly and inwardly at an angle with respect to top wall 22 toward the center length of member 20. As seen in the drawings, the lengths of supports 38 and 40 are greater than the lengths of the supports 34 and 36.

The numeral 42 refers to an elongated support which is secured by welding to top wall 22 laterally of support 38 and which extends upwardly and inwardly at an angle therefrom towards the center length of angle member number 20. As seen in the drawings, the length of support 42 is greater than the length of support 38.

The numeral 44 refers to an elongated support which has its lower end secured by welding to top wall 22 and which extends upwardly therefrom and inwardly towards the center length of the angle member number 20. As seen in the drawings, the length of support 44 is the same as support member 42 and is greater than the supports 38 and 40 and greater than the supports 34 and 36. The lengths of the supports 38, 40, 42 and 44 will be dependant upon the diameter of the pipes being hung.

The supports 34, 36, 38, 40, 42 and 44 have ball transfer units 46, 48, 50, 52, 54 and 56 mounted at the upper ends thereof respectively which are conventional in design and which include balls 60, 62, 64, 66, 68 and 70 rotatably mounted therein respectively. The ball transfer units are conventional in design and which are free to rotate in any direction. The balls 60, 62, 64, 66, 68 and 70 are adapted to engage the exterior surface of a pipe 19 supported thereon to enable the pipe 19 to be not only moved longitudinally with respect to each of the temporary attachments 10 but also to be rotated with respect thereto. The supports 38, 40, 42 and 44 may also be adjustably secured to top wall 22 as will be described hereinafter.

Figure 2:
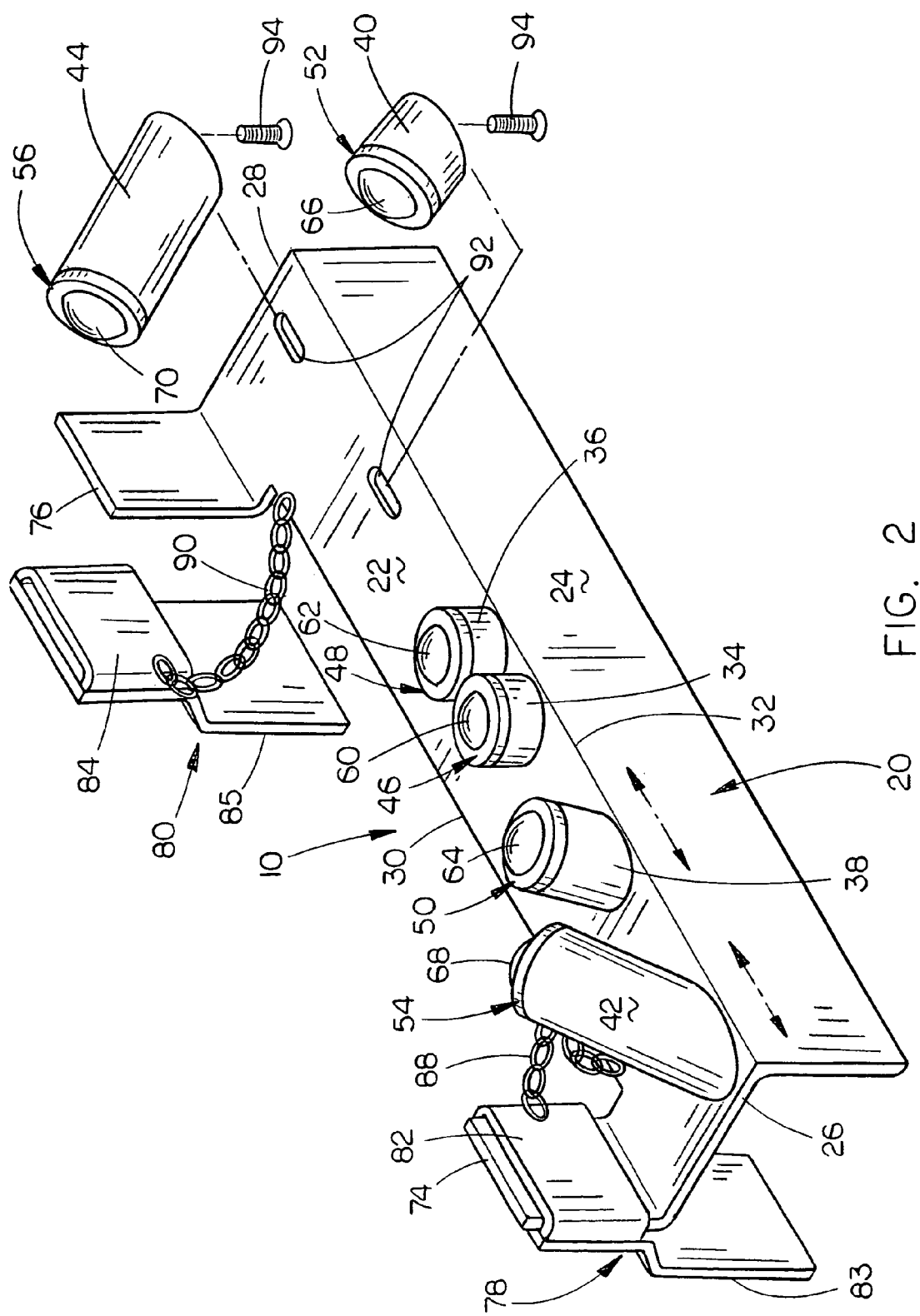
FIG. 2 is an exploded perspective view of a second embodiment of the temporary attachment of this invention.
Figure 6:
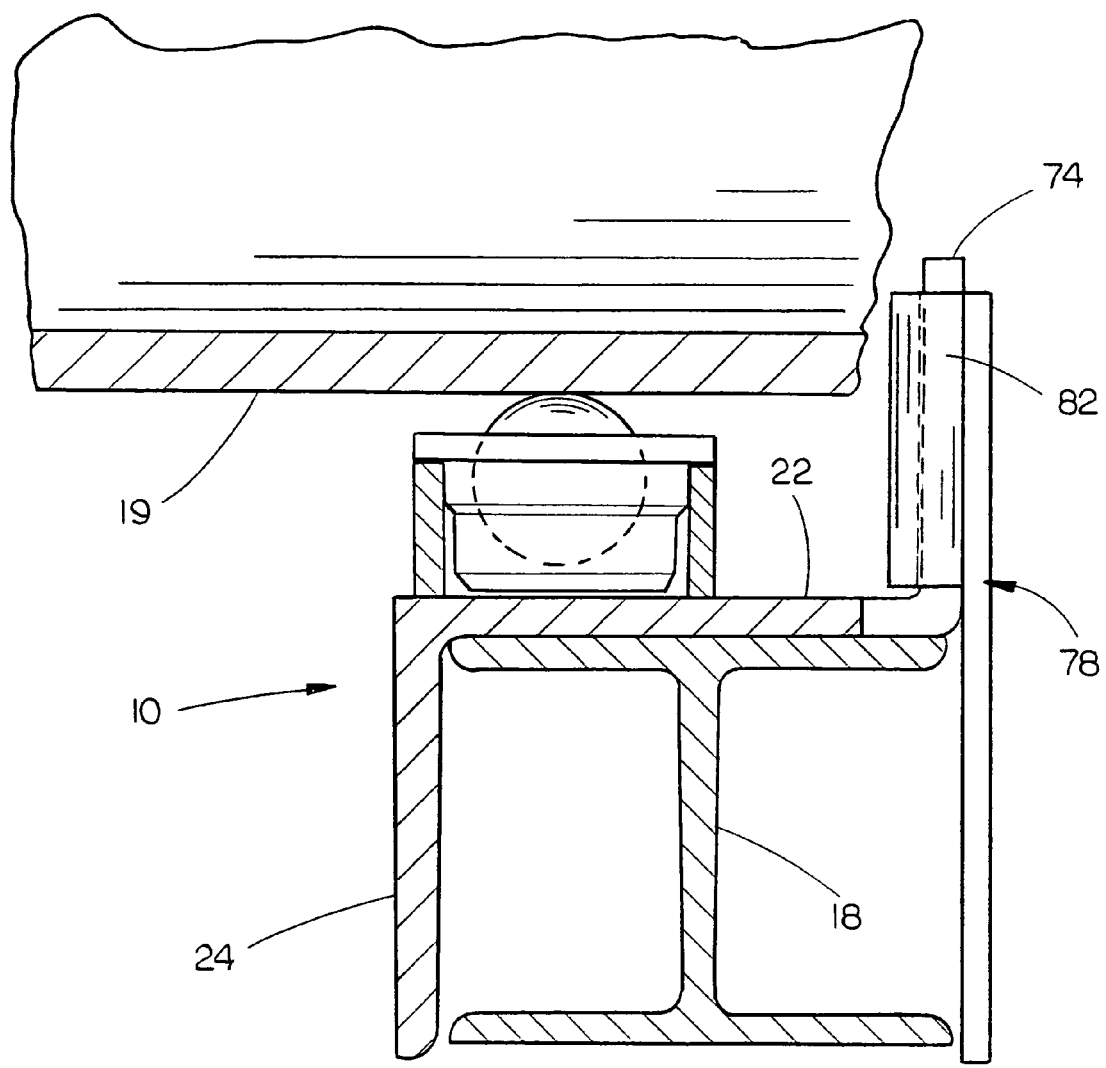
FIG. 6. is a partial sectional view illustrating the manner in which a pipe is temporarily supported on the attachment of this invention.

A pair of upstanding plates 74 and 76 are secured to top wall 22 at the opposite ends thereof by welding of the like and extend upwardly therefrom. The numerals 78 and 80 refer to retainers which have U-shaped channels 82 and 84 secured to the upper inner ends thereof which are adapted to receive the plates 74 and 76 respectively as will be described in more detail hereinafter. The retainers 78 and 80 may have offset portions 83 and 85 at the lower ends thereof as seen in FIG. 2 or may not have any offset portions as seen in FIG. 6. The offset portions 83 and 85 permit the attachment 10 to accommodate I-beams 18 which have various widths. The amount of offset will depend on width of the I-beam 18.

Preferably, the retainers 78 and 80 are connected to the top wall 22 by means of chains 88 and 90 or the like to provide a convenient means for maintaining the retainers 78 and 80 near the attachment 10 for use thereon.

The lengths of supports 38, 40, 42 and 44 will be dependant upon the diameter of the pipes 19 being supported thereby. It is also preferred that the supports 38, 40, 42 and 44 be laterally adjustable with respect to the angle member number 20 to accommodate different pipe sizes without varying the lengths thereof as illustrated in FIG. 2. As seen, the top wall 22 of member 20 has a plurality of slots 92 formed therein. Slots 92 communicate with slots 93 which are recessed into the bottom of top wall 22 so that the heads of the bolts 94 are received therein. Bolts 94 are threadably received by the lower ends of at least supports 38, 40, 42 and 44. If the slots 92 are not used, the supports 38, 40, 42 and 44 will be welded to top wall 22 of angle member 20 as previously described.

When it is desired to support or suspend a pipeline which is comprised of a plurality of pipes 19 which will be joined together in an end-to-end relationship by welding of the like, the temporary attachments 10 are placed on the I-beams 18 with the retainers 78 and 80 being mounted on the plates 74 and 76 respectively, which ensures that the attachment 10 will not become dislodged from the supporting beams 18 during the installation of the pipes. A length of pipe 19 is then extended horizontally downwardly through the pipe hangers 12 of the bridgework or framework and which will be supported on the balls of the ball transfer units 60, 62, 64, 66, 68 and 70 respectively. The ball transfer units 46, 48, 50, 52, 54 and 56 permit the pipe 19 to be supported on the attachment 10 and to be moved longitudinally with respect thereto as illustrated by the arrows in FIG. 2. When it is desired to weld the abutting ends of pipes 19, the pipes 19 may be rotated about their longitudinal axis which permits a welder to gain access to all sides of pipe 19 by simply rotating the same on the ball transfer units.

When the pipeline has been constructed, each of the temporary attachments 10 are removed from their supporting beam as follows. The retainers 78 and 80 are moved upwardly with respect to the plates 74 and 76 and will be suspended from the chains 88 and 90 respectively. The associated pipe 19 which is supported on the attachment 10 will be slightly raised by a crane or the like so that the attachment 10 may be moved laterally with respect to the supporting I-beam 18 until the attachment 10 is free from any engagement with the beam 18. The attachment 10 is then either stored or used farther down the pipeline to again support pipes 19. After the attachments 10 have been removed, the pipes 19 will then be lowered by a crane or the like until the pipes 19 are supported on the beams 18.

Thus it can be seen that a novel temporary attachment has been provided for use with pipe hangers, wherein the pipes being supported thereon may not only moved longitudinally with respect thereto but which also may be rotatably mounted with respect thereto. Further, the supports of the ball transfer units may have their lengths varied to accommodate pipes 19 of different diameters. Additionally, some of the supports may also be longitudinally adjusted with respect to angle member 20. The attachment 10 is easily installed on its supporting beam or pipe hanger, is securely held in place as it is being used, and is easily removed from its supporting beam of the associated pipe hanger.

It can therefore be seen that the invention accomplishes at least all of the stated objectives.

The invention claimed is:

1. In combination with a pipe hanger having a horizontally disposed lower support member, a temporary attachment comprising:
- an elongated angle member having a horizontally disposed top wall with first and second ends and first and second sides, a vertically disposed side wall extending downwardly from said first side of said top wall, an upper end and a lower end;
- said angle member adapted to be removably positioned on the lower support member;
- at least first and second upstanding spaced-apart supports extending upwardly from said top wall at the center length thereof;
- at least a third support secured to said top wall outwardly of said first support and extending upwardly from said top wall at an angle thereto towards the center length of said top wall;
- at least a fourth support secured to said top wall outwardly of said second support and extending upwardly from said top wall at an angle thereto towards the center length of said top wall;
- at least a fifth support secured to said top wall outwardly of said third support and extending upwardly from said top wall at an angle thereto towards the center length of said top wall;
- at least a sixth support secured to said top wall outwardly of said fourth support and extending upwardly from said top wall at an angle thereto toward the center length of said top wall; and
- each of said supports having a ball transfer unit mounted at the upper end thereof adapted to engage the exterior surface of a pipe supported on said supports, whereby the pipe may be longitudinally moved with respect to said supports and rotatably moved with respect to said supports.

2. The combination of claim 1 wherein each of said ball transfer units have a ball rotatably mounted in the upper ends thereof.

3. The combination of claim 1 wherein at least some of said upstanding supports are selectively longitudinally adjustably mounted on said angle member.

4. The combination of claim 1 wherein said third and fourth supports have the same length and wherein the length of said third and fourth supports is greater than the lengths of said first and second supports.

5. The combination of claim 4 wherein said fifth and sixth supports have the same length and wherein the length of said fifth and sixth supports is greater than the lengths of said third and fourth supports.

6. The combination of claim 1 wherein first and second retainers are selectively secured to said angle member at said second side thereof which extend downwardly therefrom opposite to said side wall thereof.

7. The combination of claim 6 wherein first and second plates are secured to said angle member at said second side thereof which extend upwardly therefrom and wherein said first and second retainers are adapted to be selectively removably secured to said first and second plates respectively.

8. The combination of claim 7 wherein elongated flexible members secure each of said retainers to said angle member.

9. The combination of claim 7 wherein each of said retainers includes a channel member adapted to selectively removably receive one of said plates therein.

10. The combination of claim 7 wherein each of said retainers includes an offset lower portion which is positioned laterally outwardly of said second side of said angle member.

11. In combination with a pipe hanger having a horizontally disposed lower support member, a temporary attachment comprising:
- an elongated base member adapted to be selectively removably positioned on the lower support member;
- a plurality of upstanding pipe supports secured to said base member, some of said pipe supports extend vertically upwardly from said base member and at least some of said pipe supports extend upwardly and inward from side base member towards the center length of said base member;
- the upper ends of said pipe supports having a ball transfer unit mounted therein which includes a rotatable ball whereby a pipe may be supported thereon, may be longitudinally moved, and rotatably moved with respect thereto; and
- at least some of said pipe supports are longitudinally adjustably mounted on said base member.

12. In combination with a pipe hanger having a horizontally disposed lower support member, a temporary attachment comprising:
- an elongated base member adapted to be selectively removably positioned on the lower support member;
- a plurality of upstanding pipe supports secured to said base member, some of said pipe supports extend vertically upwardly from said base member and at least some of said pipe supports extend upwardly and inward from side base member towards the center length of said base member;
- the upper ends of said pipe supports having a ball transfer unit mounted therein which includes a rotatable ball whereby a pipe may be supported thereon, may be longitudinally moved and rotatably moved with respect thereto;
- said base member having first and second sides;
- at least one retainer member selectively extending downwardly from said second side of said base member;
- and a side wall member extending downwardly from said first side of said base member.

* * * * *